United States Patent
Monnier et al.

(10) Patent No.: US 12,448,574 B2
(45) Date of Patent: Oct. 21, 2025

(54) PRODUCTION OF HYDROCARBON FUELS FROM LIGNIN-DERIVED MATERIALS

(71) Applicant: HIS MAJESTY THE KING IN RIGHT OF CANADA, AS REPRESENTED BY THE MINISTER OF NATURAL RESOURCES, Ottawa (CA)

(72) Inventors: Jacques Monnier, Ottawa (CA); Yi Zhang, Ottawa (CA)

(73) Assignee: HIS MAJESTY THE KING IN RIGHT OF CANADA, AS REPRESENTED BY THE MINISTER OF NATURAL RESOURCES (CA)

(*) Notice: Subject to any disclaimer, the term of this patent is extended or adjusted under 35 U.S.C. 154(b) by 0 days.

(21) Appl. No.: 19/041,482

(22) Filed: Jan. 30, 2025

(65) Prior Publication Data

US 2025/0179372 A1    Jun. 5, 2025

Related U.S. Application Data

(63) Continuation of application No. PCT/CA2024/050240, filed on Feb. 27, 2024.
(Continued)

(51) Int. Cl.
*C10G 3/00* (2006.01)
*B01J 8/04* (2006.01)
*C10G 7/00* (2006.01)

(52) U.S. Cl.
CPC ...... *C10G 3/50* (2013.01); *B01J 8/04* (2013.01); *C10G 7/00* (2013.01);
(Continued)

(58) Field of Classification Search
CPC ...... B01J 8/04; B01J 2219/00033; C10G 3/50; C10G 7/00; C10G 2300/1014;
(Continued)

(56) References Cited

U.S. PATENT DOCUMENTS

| 10,577,544 B2 | 3/2020 | Rover et al. |
| 2003/0115792 A1 | 6/2003 | Shabtai et al. |

(Continued)

FOREIGN PATENT DOCUMENTS

| CN | 112044465 A | 12/2020 |
| CN | 112076749 A | 12/2020 |

(Continued)

OTHER PUBLICATIONS

Barroso-Martin, I., 2022, IET Renewable Power Generation, 16, 3009-3022. <DOI: 10.1049/rpg2.12477> (Year: 2022).*

(Continued)

*Primary Examiner* — Brian A Mccaig
(74) *Attorney, Agent, or Firm* — Billion & Armitage

(57) ABSTRACT

A continuous process for producing hydrocarbon products, such as jet fuel, diesel, and naphtha, from lignin-derived materials comprising lignin oligomers, via hydrodeoxygenation in presence of catalysts under hydrogen pressure. These hydrocarbon products can then be fractionated into fuels such as naphtha, jet fuel, or diesel. Preferably, the jet fuel and diesel meet the corresponding fuel standards. Preferably, the naphtha meets key specifications of the corresponding gasoline and naphtha standards. Because lignin-derived materials are produced from biomass, the hydrocarbon products, including the jet fuel, diesel, and naphtha produced by this process, may contain up to 100% biogenic carbon.

19 Claims, 2 Drawing Sheets

Related U.S. Application Data

(60) Provisional application No. 63/448,715, filed on Feb. 28, 2023.

(52) U.S. Cl.
CPC ............... *B01J 2219/00033* (2013.01); *C10G 2300/1014* (2013.01); *C10G 2300/202* (2013.01); *C10G 2300/30* (2013.01); *C10G 2300/4006* (2013.01); *C10G 2300/4012* (2013.01); *C10G 2300/44* (2013.01); *C10G 2300/70* (2013.01); *C10G 2300/802* (2013.01); *C10G 2400/04* (2013.01); *C10G 2400/08* (2013.01)

(58) Field of Classification Search
CPC .......... C10G 2300/202; C10G 2300/30; C10G 2300/4006; C10G 2300/4012; C10G 2300/44; C10G 2300/70; C10G 2300/802; C10G 2400/04; C10G 2400/08
See application file for complete search history.

(56) References Cited

U.S. PATENT DOCUMENTS

| | | |
|---|---|---|
| 2008/0050792 A1* | 2/2008 | Zmierczak ............... C10G 3/50 435/161 |
| 2009/0250376 A1 | 10/2009 | Brandvold et al. |
| 2009/0294324 A1 | 12/2009 | Brandvold et al. |
| 2009/0301930 A1 | 12/2009 | Brandvold et al. |
| 2010/0076238 A1 | 3/2010 | Brandvold et al. |
| 2010/0077655 A1 | 4/2010 | Bauldreay et al. |
| 2010/0137663 A1 | 6/2010 | Chen et al. |
| 2011/0277378 A1 | 11/2011 | Von et al. |
| 2012/0151826 A1 | 6/2012 | Powell et al. |
| 2012/0152836 A1 | 6/2012 | Powell et al. |
| 2012/0238787 A1 | 9/2012 | Gruber et al. |
| 2013/0118059 A1 | 5/2013 | Lange et al. |
| 2013/0263498 A1 | 10/2013 | Kania et al. |
| 2013/0276361 A1 | 10/2013 | Maschmeyer |
| 2014/0000154 A1 | 1/2014 | Powell |
| 2014/0005445 A1 | 1/2014 | Komplin et al. |
| 2014/0051872 A1 | 2/2014 | Blank et al. |
| 2014/0088330 A1 | 3/2014 | Powell et al. |
| 2014/0250773 A1 | 9/2014 | Chen et al. |
| 2014/0273118 A1 | 9/2014 | Held et al. |
| 2015/0183701 A1 | 7/2015 | Blank et al. |
| 2016/0184795 A1 | 6/2016 | Powell et al. |
| 2016/0186066 A1 | 6/2016 | Powell et al. |
| 2017/0002272 A1 | 1/2017 | Johnson et al. |
| 2017/0029712 A1 | 2/2017 | Varma et al. |
| 2018/0298288 A1 | 10/2018 | Urade et al. |
| 2019/0169508 A1 | 6/2019 | Urade et al. |
| 2021/0395621 A1 | 12/2021 | Andersson et al. |

FOREIGN PATENT DOCUMENTS

| | | |
|---|---|---|
| EP | 2698416 A2 | 2/2014 |
| WO | 2006119357 A2 | 11/2006 |
| WO | 2009126508 A2 | 10/2009 |
| WO | 2010117436 A1 | 10/2010 |
| WO | 2011064172 A1 | 6/2011 |
| WO | 2016066835 A1 | 5/2016 |
| WO | 2017078582 A1 | 5/2017 |
| WO | 2019138002 A1 | 7/2019 |
| WO | 2022090364 A1 | 5/2022 |

OTHER PUBLICATIONS

"International Search Report and Written Opinion for corresponding PCT App. No. PCT/CA2024/050240, mailed Apr. 11, 2024. 10 pages."

Shabtai, J., "Conversion of Lignin. 2. Production of High-Octane Fuel Additives.", Am. Chem. Soc. Div. Fuel. Chem. Prepr. 44(2), 267 (1999). 6 pages.

Zhang, et al., "Production of drop-in biofuels from lignin-derived feedstocks", Presentation to the 24th Canadian Symposium on Catalysis, Ottawa, ON, May 9, 2016. 1 page.

Zhang, et al., "Production of drop-in biofuels from lignin-derived feedstocks", Presentation to the 25th North American Catalysis Society Meeting, Denver, CO, USA, Jun. 5, 2017. 1 page.

"International Search Report dated Apr. 4, 2024".

* cited by examiner

PRODUCTION OF HYDROCARBON FUELS FROM LIGNIN-DERIVED MATERIALS

CROSS-REFERENCE TO RELATED APPLICATIONS

This application is a continuation of PCT Application No. PCT/CA2024/050240, entitled "PRODUCTION OF HYDROCARBON FUELS FROM LIGNIN-DERIVED MATERIALS", filed on Feb. 27, 2024, which claims priority to U.S. Provisional Patent Application No. 63/448,715, entitled "PRODUCTION OF SUSTAINABLE AVIATION FUEL, RENEWABLE DIESEL, AND RENEWABLE NAPHTHA FROM LIGNIN-DERIVED MATERIALS", filed on Feb. 28, 2023, the entire disclosures of which are hereby incorporated by reference.

TECHNICAL FIELD

The present invention relates to the production of lignin-derived hydrocarbon products. More specifically, the present invention relates to a process for producing one or more hydrocarbon fuels, such as jet fuel, diesel, or naphtha, from lignin-derived materials.

BACKGROUND

The transportation sector is a major contributor to $CO_2$ emissions, which cause climate change. Major efforts are required to reach net zero carbon emissions by 2050. Although electrification of light-duty vehicles is feasible and is in progress, the aviation, long-haul trucking, rail, and marine sectors are hard to electrify.

One potential solution to reduce the carbon footprint of hard-to-electrify transportation sectors is in the use of renewable biofuels. Preferably, the process for generating the renewable biofuels should have a low carbon intensity. Generating renewable biofuels using biogenic carbon-containing raw materials, especially if the renewable biofuels can be directly substituted for currently used fossil fuels, would greatly assist in the decarbonisation of hard-to-electrify transportation sectors.

One such biogenic carbon-containing raw material is lignin. Lignin is a major constituent of lignocellulosic biomass, along with cellulose and hemicellulose. Lignin is a by-product at pulp and paper mills, at cellulosic ethanol production facilities and from biomass fractionation processes. Accordingly, lignin is plentiful and renewable. Such lignin can then be made into a lignin-derived material (lignin oligomers) using depolymerization.

There is therefore a need for systems and processes that generate sustainable hydrocarbon products for transportation applications, such as sustainable aviation fuel, renewable diesel, and renewable naphtha. Preferably, these products are directly substitutable for fossil fuels (i.e., drop-in biofuels).

SUMMARY

This document discloses a continuous process for producing one or more hydrocarbon fuels, such as sustainable aviation fuel, renewable diesel, and renewable naphtha, from lignin-derived materials. The process uses a two-stage system, comprising a first and second continuous reactor, for hydrodeoxygenation to convert the lignin-derived materials into hydrocarbon products. These hydrocarbon products can then be fractionated into one or more hydrocarbon fuels such as naphtha, jet fuel, or diesel. Preferably, these fuels meet transportation fuel specifications. Because lignin-derived materials are produced from biomass, the hydrocarbon products, including the jet fuel, diesel, and naphtha produced by this process, can contain up to 100% biogenic carbon.

In a first aspect, this document discloses a process for producing one or more hydrocarbon fuels, said process comprising: (a) providing a lignin-derived material as a feedstock, said lignin-derived material comprising lignin oligomers; (b) placing said feedstock into a feedstock stream; (c) hydrodeoxygenating said feedstock stream in a first continuous reactor by contacting said feedstock stream with gaseous hydrogen in the presence of a first catalyst to thereby produce a partially hydrodeoxygenated intermediate that exits said first continuous reactor; (d) separating gaseous and aqueous by-products from said partially hydrodeoxygenated intermediate to thereby obtain an organic intermediate; (e) hydrodeoxygenating said organic intermediate in a second continuous reactor by contacting said organic intermediate with gaseous hydrogen in the presence of a second catalyst to thereby produce a hydrodeoxygenated product that exits said second continuous reactor; (f) separating second-stage by-products from said hydrodeoxygenated product to thereby produce a hydrocarbon product; and (g) fractionating said hydrocarbon product to obtain said one or more hydrocarbon fuels, wherein said process is continuous.

The present invention may be implemented such that said lignin oligomers comprise about 5 wt % to about 40 wt % oxygen and wherein said lignin oligomers are produced by lignin depolymerization.

The present invention may be implemented such that step (b) comprises one of: dispersing said feedstock in at least one of: a recycled stream of said organic intermediate from said first continuous reactor or in a refinery stream; or dissolving said feedstock in a solvent.

The present invention may be implemented such that said refinery stream comprises at least one of: naphtha, kerosene, gas oil, vacuum distillate, fuel oil #2, light cycle oil (LCO), vacuum gas oil (VGO), middle distillates, or a blend thereof.

The present invention may be implemented such that when said feedstock is dissolved in said solvent, said solvent comprises at least one of: 2-methoxyphenol, ethyl acetate, methanol, ethanol, propanol, butanol, or a blend thereof.

The present invention may be implemented such that said first catalyst is a metal catalyst, said metal catalyst comprising at least one metal, said at least one metal being selected from at least one of Group VIB elements or Group VIIIB elements.

The present invention may be implemented such that said Group VIB element is at least one of molybdenum or tungsten and wherein said Group VIIIB element is at least one of iron, cobalt, nickel, ruthenium, rhodium, palladium, or platinum.

The present invention may be implemented such that said first catalyst comprises at least one of metal sulphides, metal carbides, metal nitrides, or metal phosphides.

The present invention may be implemented such that said first catalyst is supported on a catalyst support comprising at least one of: silicon dioxide, aluminum oxide, zirconium oxide, cerium oxide, titanium oxide, magnesium oxide, barium oxide, lanthanum oxide, activated carbon, magnesium aluminate spinel, or zeolites.

The present invention may be implemented such that said second catalyst is a metal catalyst, said metal catalyst comprising at least one metal, said at least one metal being selected from at least one of Group VIB elements or Group VIIIB elements.

The present invention may be implemented such that said Group VIB element is at least one of molybdenum or tungsten and wherein said Group VIIIB element is at least one of: iron, cobalt, nickel, ruthenium, rhodium, palladium, or platinum.

The present invention may be implemented such that said second catalyst comprises at least one of: metal sulphides, metal carbides, metal nitrides, or metal phosphides.

The present invention may be implemented such that said second catalyst is supported on a catalyst support comprising at least one of: silicon dioxide, aluminum oxide, zirconium oxide, cerium oxide, titanium oxide, magnesium oxide, barium oxide, lanthanum oxide, activated carbon, magnesium aluminate spinel, or zeolites.

The present invention may be implemented such that said first continuous reactor is one of: a fixed-bed reactor, a slurry reactor, or an ebullated-bed reactor.

The present invention may be implemented such that said second continuous reactor is one of: a fixed-bed reactor, a slurry reactor, or an ebullated-bed reactor.

The present invention may be implemented such that said first catalyst comprises one of: at least one Group VIB metal, the at least one Group VIB metal having a metal loading range of about 4 wt % to about 40 wt %; at least one non-noble Group VIIIB metal, the at least one non-noble Group VIIIB metal having a metal loading range of about 4 wt % to about 40 wt %; at least one Group VIB metal and at least one non-noble Group VIIIB metal, wherein the total metal loading range is about 4 wt % to about 40 wt %; at least one noble Group VIIIB metal, the at least one noble Group VIIIB metal having a metal loading range of about 0.1 wt % to about 6 wt %; or at least one noble Group VIIIB metal and at least one non-noble Group VIIIB metal, wherein the metal loading range of the at least one noble Group VIIIB metal is about 0.1 wt % to about 6 wt % and wherein the metal loading range of the at least one non-noble Group VIIIB metal is about 4 wt % to about 40 wt %, and wherein said first catalyst is suitable for hydrodeoxygenating said feedstock stream to thereby produce said partially hydrodeoxygenated intermediate.

The present invention may be implemented such that said second catalyst comprises one of: at least one Group VIB metal, the at least one Group VIB metal having a metal loading range of about 4 wt % to about 40 wt %; at least one non-noble Group VIIIB metal, the at least one non-noble Group VIIIB metal having a metal loading range of about 4 wt % to about 40 wt %; at least one Group VIB metal and at least one non-noble Group VIIIB metal, wherein the total metal loading range is about 4 wt % to about 40 wt %; at least one noble Group VIIIB metal, the at least one noble Group VIIIB metal having a metal loading range of about 0.1 wt % to about 6 wt %; or at least one noble Group VIIIB metal and at least one non-noble Group VIIIB metal, wherein the metal loading range of the at least one noble Group VIIIB metal is about 0.1 wt % to about 6 wt % and wherein the metal loading range of the at least one non-noble Group VIIIB metal is about 4 wt % to about 40 wt %, and wherein said second catalyst is suitable for hydrodeoxygenating said organic intermediate to thereby produce said hydrodeoxygenated product.

The present invention may be implemented such that each of said step (c) and said step (e) are conducted under operating conditions comprising: a temperature in the range of about 350° C. to about 450° C.; and a hydrogen gauge pressure in the range of about 6 MPa to about 18 MPa.

The present invention may be implemented such that said fractionating in said step (g) comprises fractionating by distillation of said hydrocarbon product to thereby produce at least one of jet fuel, diesel, or naphtha.

The present invention may be implemented such that said aviation fuel meets or exceeds at least one of: ASTM™ D7566 specifications or CAN/CGSB™-3.323-2020 specifications; or said diesel meets or exceeds at least one of: ASTM™ D975 specifications and CAN/CGSB™-3.517-2020 specifications.

BRIEF DESCRIPTION OF THE DRAWINGS

The present invention will now be described by reference to the following figures, in which identical reference numerals refer to identical elements and in which.

DETAILED DESCRIPTION

In one aspect, the present invention relates to the production of one or more hydrocarbon fuels. A lignin-derived material is used as a feedstock for a first continuous reactor having a first catalyst. Hydrodeoxygenating the first feedstock in the first continuous reactor produces a product that is then used as a second feedstock. The second feedstock is fed to a second continuous reactor system that completes further hydrodeoxygenation and hydrogenation of that second feedstock. This produces a hydrocarbon product that is then fractionated into the one or hydrocarbon fuels, such as naphtha, jet fuel, and diesel.

Figure 1:
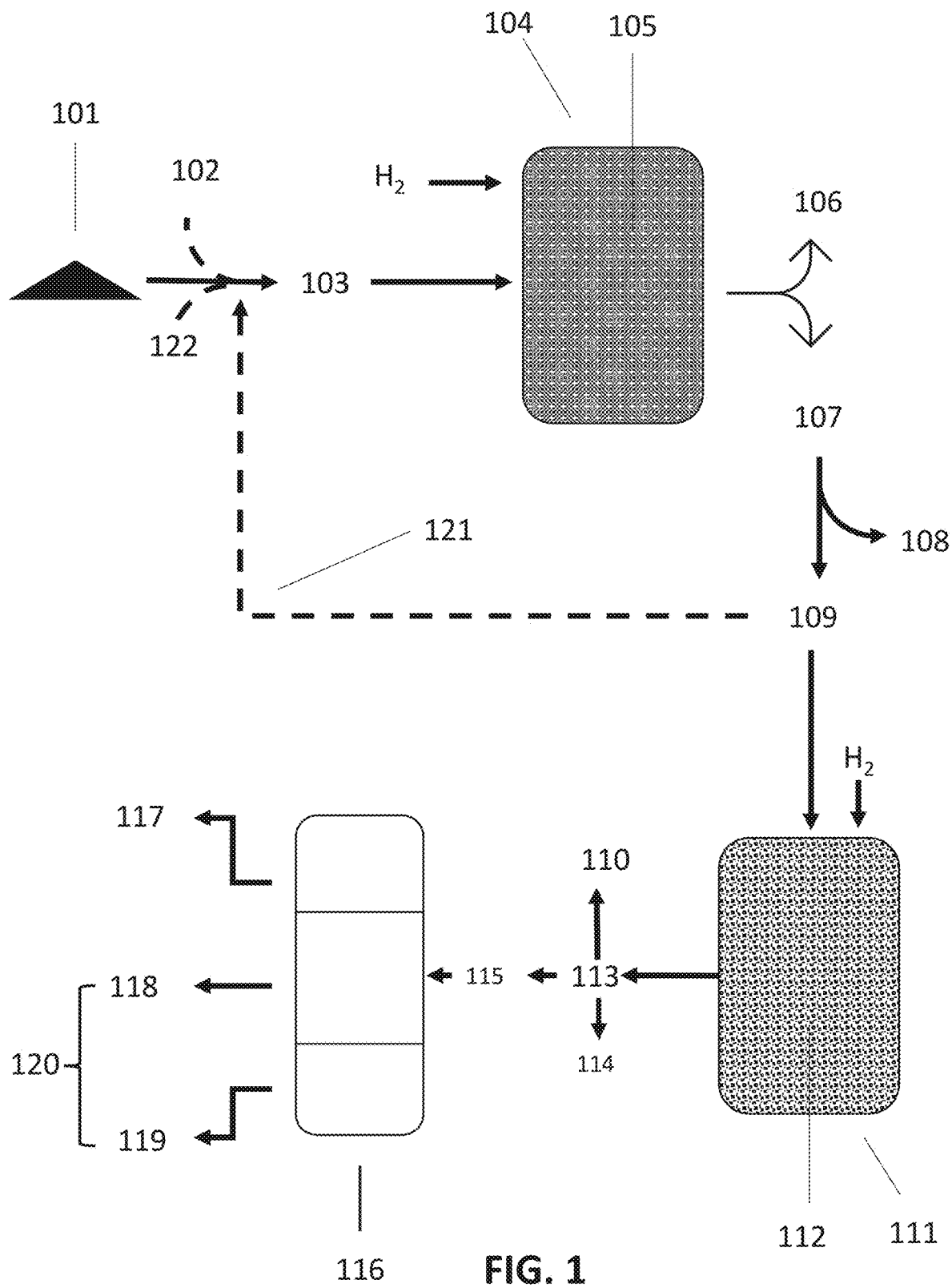
FIG. 1 is a diagram of an embodiment of the method of the present invention.

In one implementation, the lignin-derived material is from different lignin sources. For example, lignin can be taken from the waste product stream of a pulp and paper mill (i.e., black liquor) or the waste product stream of a cellulosic ethanol plant or from other biomass fractionation process. Such lignin can then be made into a lignin-derived material. Referring to FIG. 1, the lignin-derived material 101 refers to the material derived from the depolymerization of lignin (i.e., lignin oligomers).

The lignin-derived material 101 is then placed into a feedstock stream 103. To form the feedstock stream 103, the lignin-derived material 101 can be dissolved in a solvent 102. Alternatively, the lignin-derived material 101 can be dispersed in a recycled stream 121 from the first continuous reactor 104, or in a refinery stream 122 to form the feedstock stream 103. In some embodiments, the refinery stream 122 may comprise a typical refinery stream (e.g., naphtha, kerosene, middle distillate, gas oil, or vacuum distillate) or blends of such streams. Preferably, the refinery stream is at least one of: fuel oil #2, light cycle oil (LCO), vacuum gas oil (VGO), or middle distillates. In embodiments in which a solvent 102 is used, the solvent 102 may comprise at least one of 2-methoxyphenol, ethyl acetate, methanol, ethanol, propanol, or butanol, or may be a combination of suitable solvents. To be clear, the solvent 102 is optional and the lignin-derived material 101 may be dispersed directly into the feedstock stream 103 to thereby form a slurry. It should be clear that a person of skill in the art would understand how to operate with such a slurry.

In a first stage, the feedstock stream 103 is fed to a first continuous reactor 104, where the feedstock stream 103 is contacted with gaseous hydrogen in the presence of a first catalyst 105 for hydrodeoxygenation. Hydrodeoxygenation is a reaction characterized by the removal of oxygen from oxygenated hydrocarbons by reacting such oxygenated hydrocarbons with hydrogen in the presence of a catalyst. In some embodiments, the first continuous reactor 104 is a fixed-bed reactor that is packed with the first catalyst 105. In yet further embodiments, the first continuous reactor 104 is a slurry reactor or an ebullated-bed reactor loaded with the first catalyst 105.

The hydrodeoxygenation reaction can be simplified as:

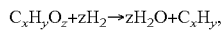

$$C_xH_yO_z + zH_2 \rightarrow zH_2O + C_xH_y.$$

This hydrodeoxygenation reaction proceeds as the feedstock stream 103 is pumped through the first continuous reactor 104. As resulting liquid products exit the first continuous reactor 104, gaseous by-products 106 separate from liquid products 107. The liquid products 107 then undergo phase separation and aqueous byproducts 108 are removed, thereby leaving an organic intermediate 109. It should be understood that the organic intermediate 109 may comprise a mixture of organic compounds.

The organic intermediate 109 has many properties showing the transformation of the lignin-derived material 101 to a partially hydrodeoxygenated product. Notably, the organic intermediate 109 is a liquid with significantly less oxygen, nitrogen, and sulphur than the original lignin-derived material 101.

Part of the organic intermediate 109 may be recycled back to disperse lignin-derived material 101 in the recycled stream 121.

The organic intermediate 109 is then fed to a second continuous reactor 111, where the organic intermediate 109 is contacted with gaseous hydrogen in the presence of a second catalyst 112 for hydrodeoxygenation.

As with the first continuous reactor 104, in some embodiments, the second continuous reactor 111 is either a fixed-bed reactor that is packed with the second catalyst 112 or a slurry reactor or an ebullated-bed reactor loaded with the second catalyst 112. The organic intermediate 109 undergoes further hydrodeoxygenation and hydrogenation in the second continuous reactor 111.

As the organic intermediate 109 passes through the second continuous reactor 111 and undergoes further hydrodeoxygenation and hydrogenation, a hydrodeoxygenated product 113 is generated. As the hydrodeoxygenated product 113 exits the second continuous reactor 111, second-stage gaseous by-products 110 separate from the hydrodeoxygenated product 113. In embodiments where a second-stage aqueous phase 114 is present in the hydrodeoxygenated product 113, the liquid products undergo phase separation and the second-stage aqueous phase 114 is removed. The removal of second-stage gaseous by-products 110 and, if present, second-stage aqueous phase 114, from the hydrodeoxygenated product 113 thus leaves a hydrocarbon product 115. It should be understood that the hydrocarbon product 115 may comprise multiple hydrocarbon compounds.

Various types of catalysts may be used as the first catalyst 105 and as the second catalyst 112. For example, supported or unsupported metal catalysts can be used. The metals in these metal catalysts may be Group VIB or Group VIIIB metals (i.e., are elements that are classified in Group VIB or Group VIIIB of the periodic table). Supported or unsupported metal sulphides, carbides, nitrides, or phosphides may also be used as catalysts. Supported catalysts may be supported on materials such as silicon dioxide, aluminum oxide, zirconium oxide, cerium oxide, titanium oxide, magnesium oxide, barium oxide, lanthanum oxide, activated carbon, magnesium aluminate spinel, zeolites, or combinations of these materials. The catalysts may be promoted, or may be unpromoted.

In some embodiments, the first catalyst 105 and second catalyst 112 are metal catalysts that comprise Group VIB (e.g., molybdenum or tungsten) and/or non-noble (e.g., iron, cobalt, or nickel) Group VIIIB metals. Such catalysts have a total metal loading ranging from about 4 wt % to about 40 wt %.

In further embodiments, the first catalyst 105 and second catalyst 112 are metal catalysts that comprise at least one noble Group VIIIB metal (e.g., ruthenium, rhodium, palladium, or platinum). Such catalysts have a total metal loading ranging from about 0.1 wt % to about 6 wt %. It should be clear that a combination of (a) at least one non-noble Group VIIIB metal and (b) at least one noble Group VIIIB metal, can be used in one, or both, of the first catalyst 105 and the second catalyst 112. In an embodiment where both noble and non-noble Group VIIIB metals are present (e.g., platinum-iron), the noble Group VIIIB metals have a total metal loading range from 0.1 wt % to 6 wt % and the non-noble Group VIIIB metals have a total metal loading ranging from 4 wt % to 40 wt %.

Regarding the operating conditions for the reactions in the first continuous reactor 104 and second continuous reactor 111, a wide range of operating conditions may be used. The temperature in the two reactors should be at least about 350° C., and preferably at least 370° C. The normal optimum operating temperature is in the range of about 370° C. to about 450° C. The hydrogen pressure can vary quite widely and is preferably in the range of about 6 MPa to about 18 MPa.

Figure 2:
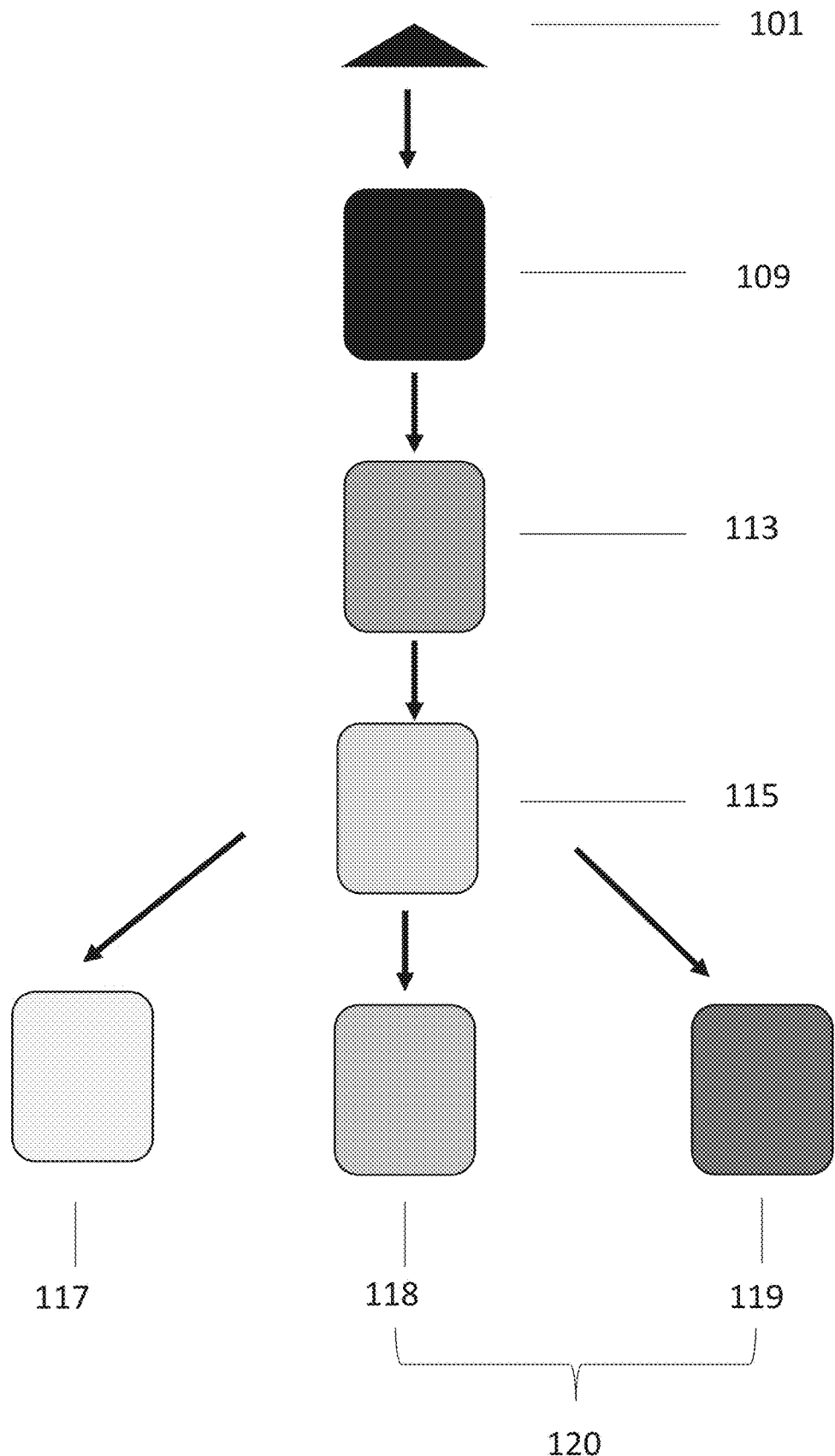
FIG. 2 is a schematic diagram of the overall process that originates with lignin-derived material, passes through the organic intermediate, the hydrocarbon product, and produces the naphtha, jet fuel, and diesel fuel.

Once the hydrocarbon product 115 has been obtained, this hydrocarbon product 115 is fractionated into one or more hydrocarbon fuels. In a preferred embodiment, the fractionation can be performed using vacuum distillation 116. The process that takes the lignin-derived material 101 to the one or more hydrocarbon fuels is schematically illustrated in FIG. 2.

The fractionation process will produce fractions with boiling points corresponding to the one or more hydrocarbon fuels. For example, fractionation of the hydrocarbon product 115 produces naphtha 117, jet fuel 118, and heavy middle distillates 119.

Preferably, the naphtha 117, jet fuel 118, and diesel 120 (i.e., combined jet fuel 118 and heavy middle distillates 119) obtained from the above process meet established standards for the relevant fuel product. By meeting such standards, these products can preferably be used as "drop-in" biofuels that require no further treatment before they can be used as a fuel in existing systems. Such drop-in fuels can also be blended with conventional petroleum-derived fuels to reduce the carbon intensity of the fossil fuels.

It should be clear that there are a number of fuel standards that, preferably, the resulting fuels adhere to. Such fuel standards include:

the ASTM™ D7566-22 specification for jet fuel, published Aug. 2, 2022, and accessible at https://www.astm.org/d7566-22.html;

the ASTM™ D975-21 specification for diesel, published Oct. 20, 2021, and accessible at https://www.astm.org/d0975-21.html;

the CAN/CGSB™-3.23-2020 specification for jet fuel, published October 2020, and accessible at https://publications.gc.ca/collections/collection_2021/ongc-cgsb/P29-003-023-2020-1-eng.pdf;

the CAN/CGSB™-3.517-2020 specification for diesel, published February 2020 and accessible at https://publications.gc.ca/site/eng/9.884942/publication.html;

the CAN/CGSB™-3.5-2021 specification for gasoline, published October 2021 and accessible at https://publications.gc.ca/collections/collection_2021/ongc-cgsb/P29-003-005-2021-eng.pdf; and the CAN/CGSB™-3.27-2018 specification for naphtha fuel, published 2018 and accessible at https://publications.gc.ca/collections/collection_2018/ongc-cgsb/P29-003-027-2018-eng.pdf.

The above references are hereby incorporated by reference in their entirety.

In a further aspect, this document discloses a two-stage continuous process for producing hydrocarbon products including naphtha 117, jet fuel 118, and diesel 120. The process first provides a lignin-derived material 101 as a feedstock. The lignin-derived material 101 may then be dispersed in a recycled stream 121 from a first continuous reactor 104, dispersed in a refinery stream 122, or dissolved in a solvent 102, all of which then form a feedstock stream 103.

The feedstock stream 103 may then be hydrodeoxygenated in a first continuous reactor 104 by contacting the feedstock stream 103 with gaseous hydrogen in the presence of a first catalyst 105 to produce a partially hydrodeoxygenated intermediate that exits the first continuous reactor 104. Gaseous by-products 106 and aqueous by-products 108 may then be separated from the partially hydrodeoxygenated intermediate to thereby obtain an organic intermediate 109.

Further, the organic intermediate 109 may then be hydrodeoxygenated and/or hydrogenated in a second continuous reactor 111 by contacting the organic intermediate 109 with gaseous hydrogen in the presence of a second catalyst 112 to produce the hydrodeoxygenated product 113 that exits the second continuous reactor 111.

Second-stage gaseous byproducts 110 and, if present, a second-stage aqueous phase 114 may then be separated from the hydrodeoxygenated product 113 to thereby produce the hydrocarbon product 115, which may then be fractionated to thereby obtain naphtha 117, jet fuel 118, and diesel fuel 120.

The present invention may be implemented such that the lignin-derived material 101 comprises lignin oligomers containing between about 5 wt % to about 40 wt % oxygen and that may be produced by lignin depolymerization.

The present invention may be implemented such that the lignin-derived material 101 is dispersed in the recycled stream 121 of the organic intermediate 109 from the first continuous reactor 104. Alternatively or additionally, the lignin-derived material 101 may be dispersed in the refinery stream 122, which may comprise at least one typical refinery stream (e.g., naphtha, kerosene, middle distillate, gas oil, or vacuum distillate), or blends of such streams. Preferably, the refinery stream 122 comprises at least one of: fuel oil #2, light cycle oil (LCO), vacuum gas oil (VGO), middle distillates, or a blend thereof. As an alternative to dispersing the lignin-derived material in the recycled stream 121 and/or the refinery stream 122, the lignin-derived material 101 may be dissolved in the solvent 102, which may comprise at least one of: 2-methoxyphenol, ethyl acetate, methanol, ethanol, propanol, butanol, or a blend thereof.

The present invention may be implemented such that the first catalyst 105 is a supported or unsupported metal catalyst, the metal being selected from Group VIB or Group VIIIB elements on the periodic table, or combinations thereof. The Group VIB metal may be at least one of molybdenum or tungsten. The Group VIIIB metal may be at least one of iron, cobalt, nickel, ruthenium, rhodium, palladium, platinum, or combinations thereof. The first catalyst 105 may be a supported or unsupported catalyst comprising metal sulphides, metal carbides, metal nitrides, or metal phosphides. If the first catalyst 105 is a supported catalyst, it may be supported on a catalyst support, such as a catalyst support comprising silicon dioxide, aluminum oxide, zirconium oxide, cerium oxide, titanium oxide, magnesium oxide, barium oxide, lanthanum oxide, activated carbon, magnesium aluminate spinel, zeolites, or combinations of these materials. The first catalyst 105 may be promoted or unpromoted.

The present invention may be implemented such that the second catalyst 112 is a supported or unsupported metal catalyst, the metal being selected from Group VIB or Group VIIIB elements on the periodic table, or combinations thereof. The Group VIB metal may be at least one of molybdenum or tungsten. The Group VIIIB metal may be at least one of iron, cobalt, nickel, ruthenium, rhodium, palladium, platinum, or combinations thereof. The second catalyst 112 may be a supported or unsupported catalyst comprising metal sulphides, metal carbides, metal nitrides, or metal phosphides. If the second catalyst 112 is a supported catalyst, it may be supported on a catalyst support, such as a catalyst support comprising silicon dioxide, aluminum oxide, zirconium oxide, cerium oxide, titanium oxide, magnesium oxide, barium oxide, lanthanum oxide, activated carbon, magnesium aluminate spinel, zeolites, or combinations of these materials. The second catalyst 112 may be promoted or unpromoted.

For clarity, the second catalyst 112 may have the same or different properties from the first catalyst 105.

The present invention may be implemented such that the first continuous reactor 104 is one of: a fixed-bed reactor that is packed with the first catalyst 105, a slurry reactor that is loaded with the first catalyst 105, or an ebullated-bed reactor loaded with the first catalyst 105. It should be understood that a slurry reactor would be loaded with an unsupported first catalyst 105, while an ebullated-bed reactor would be loaded with a supported first catalyst 105.

The present invention may be implemented such that the second continuous reactor 111 is one of: a fixed-bed reactor that is packed with the second catalyst 112, a slurry reactor that is loaded with the second catalyst 112, or an ebullated-bed reactor loaded with the second catalyst 112. It should be understood that a slurry reactor would be loaded with an unsupported second catalyst 112, while an ebullated-bed reactor would be loaded with a supported second catalyst 112.

For clarity, the first continuous reactor 104 and the second continuous reactor 111 may be of the same type or may be of a different type from one another.

The present invention may be implemented such that the metal of the first catalyst 105 is at least one Group VIB metal, the first catalyst 105 having a total metal loading ranging from about 4 wt % to about 40 wt %.

The present invention may be implemented such that the metal of the first catalyst 105 is at least one non-noble Group VIIIB metal, the first catalyst 105 having a total metal loading ranging from about 4 wt % to about 40 wt %.

The present invention may be implemented such that the metal of the first catalyst 105 comprises at least one Group VIB metal and at least one non-noble Group VIIIB metal, the first catalyst 105 having a total metal loading ranging from about 4 wt % to about 40 wt %.

The present invention may be implemented such that the metal of the first catalyst 105 is at least one noble Group VIIIB metal, the first catalyst 105 having a total metal loading between about 0.1 wt % and about 6 wt %.

The present invention may be implemented such that the first catalyst 105 has a first metal, the first metal being a non-noble Group VIIIB metal, and the first catalyst 105 having a metal loading ranging from about 4 wt % to about 40 wt % of the first metal. In this implementation, the first catalyst 105 may also have a second metal, the second metal being a noble Group VIIIB metal, and the first catalyst 105 having a metal loading ranging from about 0.1 wt % to about 6 wt % of the second metal.

The present invention may be implemented such that the metal of the second catalyst 112 is at least one Group VIB metal, the second catalyst 112 having a total metal loading ranging from about 4 wt % to about 40 wt %.

The present invention may be implemented such that the metal of the second catalyst 112 is at least one non-noble Group VIIIB metal, the second catalyst 112 having a total metal loading ranging from about 4 wt % to about 40 wt %.

The present invention may be implemented such that the metal of the second catalyst 112 comprises at least one Group VIB metal and at least one non-noble Group VIIIB metal, the second catalyst 112 having a total metal loading ranging from about 4 wt % to about 40 wt %.

The present invention may be implemented such that the metal of the second catalyst 112 is at least one noble Group VIIIB metal, the second catalyst 112 having a total metal loading between about 0.1 wt % and about 6 wt %.

The present invention may be implemented such that the second catalyst 112 has a first metal, the first metal being a non-noble Group VIIIB metal, and the second catalyst 112 having a metal loading ranging from about 4 wt % to about 40 wt % of the first metal. In this implementation, the second catalyst 112 may also have a second metal, the second metal being a noble Group VIIIB metal, and the first catalyst 105 having a metal loading ranging from about 0.1 wt % to about 6 wt % of the second metal.

For clarity, the metal composition of the first catalyst 105 and the second catalyst 112 may be the same or different. Further, the metal loading of the first catalyst 105 and the second catalyst 112 may be the same or different.

The present invention may be implemented such that the first continuous reactor 104 is operated at conditions comprising: a temperature in the range of about 350° C. to 450° C.; and a hydrogen gauge pressure in the range of about 6 MPa to about 18 MPa.

The present invention may be implemented such that the second continuous reactor 111 is operated at conditions comprising: a temperature in the range of about 350° C. to 450° C.; and a hydrogen gauge pressure in the range of about 6 MPa to about 18 MPa.

For clarity, the first continuous reactor 104 and the second continuous reactor 111 may be operated at the same or different temperatures. The first continuous reactor 104 and the second continuous reactor 111 may also be operated at the same or different hydrogen gauge pressures.

The present invention may be implemented such that the hydrocarbon product 115 is fractionated by distillation to thereby produce sustainable aviation fuel 118, renewable diesel 120 and renewable naphtha 117 that contain up to 100% biogenic carbon. The jet fuel 118 may be a renewable fuel that meets or exceeds key ASTM™ D7566 specifications and CAN/CGSB™-3.323-2020 specifications. The diesel 120 may be a renewable fuel that meets or exceeds key ASTM™ D975 specifications and CAN/CGSB™-3.517-2020 specifications. The naphtha 117 may be a renewable fuel that meets or exceeds key CAN/CGSB™-3.5-2021 specifications.

The present invention will be further illustrated by means of two non-limiting examples.

Example 1

In a first example, lignin-derived material 101 was processed according to an embodiment of the invention.

Lignin-derived material 101 was first dissolved in a solvent 102 to form the feedstock stream 103. The lignin-derived material 101 comprised lignin oligomers derived from lignin depolymerization. The lignin oligomers contained about 24.5 wt % oxygen.

The feedstock stream 103 was fed into a first continuous reactor 104 having a first packed-bed reactor with a first catalyst 105 comprising a supported nickel catalyst. The first continuous reactor 104 was operated under a hydrogen pressure ranging from about 6.0 MPa to about 18 MPa, at a temperature ranging from about 350° C. to about 450° C. Organic intermediate 109 was produced after separation of the gaseous by-products 106 and aqueous phase 108.

The organic intermediate 109 from the first stage was fed into a second continuous reactor 111 comprising a second packed-bed reactor with a second catalyst 112. The second catalyst 112 comprised a supported platinum catalyst. The second continuous reactor 111 was operated under a hydrogen pressure ranging from about 6.0 MPa to about 18 MPa, at a temperature ranging from about 350° C. to about 450° C.

As the resulting products exited the second continuous reactor 111, second-stage gaseous byproducts 110 were removed. The organic phase (i.e., the hydrocarbon product 115) of the hydrodeoxygenated product 113 from the second continuous reactor 111 was then characterized. The physical characteristics of the hydrocarbon product 115 are presented in Table 1:

TABLE 1

| Characteristics | Measurement |
| --- | --- |
| Density (@ 15° C., kg/m$^3$) | 839.5 |
| Elemental analysis (wt %) | |
| C | 86.6 |
| H | 13.7 |
| O | <0.10 |
| Sulphur (ppm) | <1.0 |
| Total nitrogen (ppm) | <1.0 |
| Water content (mg/kg) | 13.3 |
| H/C atomic ratio | 1.89 |

Notably, the sulphur, nitrogen, and oxygen contents of the hydrocarbon product 115 were significantly reduced relative to the feedstock stream 103. Further, the H/C atomic ratio increased, indicating increased hydrogenation of the hydrocarbons. The hydrocarbon product 115 contains 100% biogenic carbon.

The hydrocarbon product 115 resulting from the second continuous reactor 111 of the process was then fractionated by vacuum distillation into naphtha 117, jet fuel 118, and heavy middle distillates 119. The diesel 120 fraction was obtained by combining the jet fuel 118 and heavy middle distillates 119. Each fraction (i.e., naphtha 117, jet fuel 118, and diesel 120) was then assayed against the relevant specification for the fuel product corresponding to each fraction.

The naphtha 117 fraction was assayed and compared to the CAN/CGSB™-3.5-2021 standard. The comparative results are shown in Table 2:

TABLE 2

| Characteristic | CAN/CGSB™-3.5-2021 Standard | Naphtha Fraction |
|---|---|---|
| Density (@ 15° C., kg/m³) | N/A | 776.2 |
| Specific gravity (60/60F) | N/A | 0.7770 |
| Elemental analysis (wt %) | | |
| C | N/A | 86.4 |
| H | N/A | 14.4 |
| N | N/A | <0.15 |
| S | ≤12 ppm | 1.3 ppm |
| O | N/A | 0.12 |
| Simulated distillation (° C.) | | |
| Initial boiling point | N/A | 57.0 |
| 10 vol % recovered | N/A | 70.0 |
| 50 vol % recovered | N/A | 94.5 |
| 90 vol % recovered | N/A | 146.5 |
| Final boiling point | <225 | 182.0 |
| Aromatics (vol %) | N/A | 5.5 |
| Benzene (vol %) | ≤1.5 | 0.005 |
| Paraffins (vol %) | N/A | 6.8 |
| Olefins (vol %) | N/A | 8.9 |
| Naphthenes (vol %) | N/A | 56.2 |
| i-Paraffins (vol %) | N/A | 18.7 |
| Oxygenates (vol %) | N/A | 0.0 |
| Copper corrosion (3 h @ 50° C.) | No. 1 (1a or 1b) | No. 1b |

As can be seen from Table 2, the naphtha 117 fraction produced met or exceeded the requirements for the listed properties from the CAN/CGSB™-3.5-2021 standard.

The jet fuel 118 fraction produced was assayed and compared to the ASTM™ D7566 jet fuel standard. The comparative results are presented in Table 3:

TABLE 3

| Characteristic | ASTM™ D7566 Standard | Jet Fuel Fraction |
|---|---|---|
| COMPOSITION | | |
| Acidity (mg KOH/g fuel) | ≤0.10 | 0.002 |
| Aromatics (vol %) | ≤25 | 6.0 |
| Sulphur mercaptans (wt %) | ≤0.0030 | <0.0003 |
| Sulphur (wt %) | ≤0.3 | <0.00010 |
| VOLATILITY | | |
| Distillation (° C.) | | |
| 10 vol % recovered | ≤205 | 186.5 |
| 50 vol % recovered | N/A | 213.1 |
| 90 vol % recovered | N/A | 247.1 |
| Final boiling point | <300 | 262.9 |
| Distillation residue (vol %) | ≤1.5 | 1.0 |
| Distillation loss (vol %) | ≤1.5 | 0.9 |
| Flash point (° C.) | ≥38 | 41 |
| Density (@ 15 ° C., kg/m³) | 775 to 840 | 851.1 |
| FLUIDITY | | |
| Freezing point (° C.) | ≤−40 | <−80 |
| Kinematic viscosity (@ −20° C., cSt) | ≤8.0 | 5.594 |
| COMBUSTION | | |
| Net heat of combustion (D3338 standard, MJ/kg) | ≥42.8 | 42.882 |
| Net heat of combustion (D4809 standard, MJ/kg) | ≥42.8 | 42.820 |
| Net heat of combustion (D4529 standard, MJ/kg) | ≥42.8 | 42.568 |
| Smoke point (mm) | ≥18 | 20 |
| Naphthalenes (vol %) | ≤3.0 | 0.11 |
| CORROSION | | |
| Copper strip corrosion (2 h @ 100° C.) | No. 1 (1a or 1b) | No. 1b |
| THERMAL STABILITY (measured 2.5 h @ 260° C.) | | |
| Pressure drop across filter (mm Hg) | ≤25 | 0 |
| Heater tube deposit colour (rating) | ≤3 | <1 |
| CONTAMINANTS | | |
| Existent gum (mg/100 mL, vapourized in non-filtered air) | ≤7 | 2 |
| Microseparometer (Test A rating) | ≥85 | 97 |
| ADDITIVES | | |
| Electrical conductivity (pS/m @ 21° C.) | ≤600 | 5 |

As can be seen from Table 3, the jet fuel 118 produced in Example 1 meets or exceeds the vast majority of the specifications in the ASTM™ D7566 jet fuel standard. The specification for density can be easily met through blending with jet fuel in common use.

Finally, the diesel 120 fraction (i.e., a combination of jet fuel 118 and heavy middle distillates 119) was assayed and compared to both Type A and Type B of the CAN/CGSB™-3.517-2020 fuel standard for diesel. The diesel 120 fraction was also assayed and compared to the No. 1-D and No. 2-D standards of the ASTM™ D975 fuel standard. The comparative results are found in Table 4:

TABLE 4

| Characteristic | CAN/CGSB™-3.517-2020 Type A | CAN/CGSB™-3.517-2020 Type B | ASTM™ D975 No. 1-D | ASTM™ D975 No. 2-D | Diesel Fraction |
|---|---|---|---|---|---|
| Flash point (° C.) | ≥40.0 | ≥40.0 | ≥38 | ≥52 | 61.5 |
| Kinematic viscosity (@ 40° C., cSt) | 1.30-3.60 | 1.70-4.10 | 1.3-2.4 | 1.90-4.10 | 2.174 |
| Distillation T, 90 vol % recovery (° C.) | ≤290 | ≤360 | ≤288 | 282-338* | 278.6 |
| Water and sediment (vol %) | ≤0.02 | ≤0.02 | ≤0.05 | ≤0.05 | 0.01 |

TABLE 4-continued

| Characteristic | CAN/CGSB ™-3.517-2020 Type A | CAN/CGSB ™-3.517-2020 Type B | ASTM ™ D975 No. 1-D | ASTM ™ D975 No. 2-D | Diesel Fraction |
|---|---|---|---|---|---|
| Acid (mg KOH/g) | ≤0.10 | ≤0.10 | N/A | N/A | <0.10 |
| Sulphur (mg/kg) | <15 | ≤15 | ≤15 | ≤15 | 0.6 |
| Copper strip corrosion (3 h @ 50° C.) | No. 1 (1a or 1b) | No. 1 (1a or 1b) | No. 3 or lower | No. 3 or lower | No. 1b |
| Carbon residue (10% bottoms, wt %) | ≤0.1 | ≤0.2 | ≤0.15 | ≤0.35 | <0.1 |
| Ash (wt %) | ≤0.010 | ≤0.010 | ≤0.01 | ≤0.01 | <0.010 |
| Cloud point (° C.) | Varies with period and location of intended use | Varies with period and location of intended use | Varies | Varies | −36 |
| Conductivity (on delivery, pS/m) | ≥25 | ≥25 | N/A | N/A | 1 at 21.7° C. |
| Lubricity (μm @ 60° C.) | ≤460 | ≤460 | <520 | ≤520 | 590 |
| Derived Cetane number (DCN) | >40.0 | ≥40.0 | >40 | >40 | 39.14 |

*values outside this range are permissible, depending on temperature and blend

As can be seen from Table 4, the diesel 120 produced in Example 1 meets or exceeds most of the specifications for all diesel fuel standards. Similar to commercial Ultra Low Sulfur Diesel (ULSD), the diesel fraction 120 requires lubricity and electrical conductivity additives. Additionally, a cetane enhancer additive can be added to boost the ignition quality of the diesel 120 produced.

As can be seen from the above, the hydrocarbon fuels produced in Example 1 can contain up to 100% biogenic carbon and meet or exceed the specifications of the standards used to assay the jet fuel 118 and diesel 120 using the process of the present invention. The naphtha 117 meets or exceeds key CAN/CGSB™-3.5-2021 specifications. Where those specifications are not met, they can be met through blending or other common techniques known in the art.

Example 2

In a second embodiment, lignin-derived material 101 was dispersed in a refinery stream 122 to form the feedstock stream 103. The lignin-derived material 101 comprised lignin oligomers derived from lignin depolymerization. The lignin oligomers contained about 24.5 wt % oxygen.

The feedstock stream 103 was fed into a first continuous reactor 104, the first continuous reactor 104 being a fixed-bed reactor. The first continuous reactor 104 was loaded with a first catalyst 105 comprising a supported nickel catalyst. The first continuous reactor 104 was operated under a hydrogen pressure ranging from about 6.0 MPa to about 18 MPa, at a temperature ranging from about 350° C. to about 450° C. Organic intermediate 109 was produced. Because its oxygen content is similar to that of the organic intermediate 109 of Example 1, the organic intermediate 109 produced according to this embodiment is expected to be capable of being processed via the second continuous reactor 111 in accordance with the embodiment of Example 1.

The expression 'at least one of X and Y', as used herein, means and should be construed as meaning 'X, or Y, or both X and Y'.

The expression "about", as used herein when referring to a numerical value, means and should be construed as meaning a range formed by that value, plus or minus 10%. For example, "about 100° C." should be construed as "100° C.±10° C.", that is, "90° C. to 110° C.".

A person understanding this invention may now conceive of alternative structures and embodiments or variations of the above, all of which are intended to fall within the scope of the invention as defined in the claims that follow.

We claim:

1. A process for producing one or more hydrocarbon fuels, said process comprising:
   (a) providing a lignin-derived material as a feedstock, said lignin-derived material comprising lignin oligomers;
   (b) placing said feedstock into a feedstock stream;
   (c) hydrodeoxygenating said feedstock stream in a first continuous reactor by contacting said feedstock stream with gaseous hydrogen in the presence of a first catalyst to thereby produce a partially hydrodeoxygenated intermediate that exits said first continuous reactor;
   (d) separating gaseous and aqueous by-products from said partially hydrodeoxygenated intermediate to thereby obtain an organic intermediate;
   (e) hydrodeoxygenating said organic intermediate in a second continuous reactor by contacting said organic intermediate with gaseous hydrogen in the presence of a second catalyst to thereby produce a hydrodeoxygenated product that exits said second continuous reactor;
   (f) separating second-stage by-products from said hydrodeoxygenated product to thereby produce a hydrocarbon product; and
   (g) fractionating said hydrocarbon product to obtain said one or more hydrocarbon fuels,
   wherein said process is continuous, and wherein each of said step (c) and said step (e) are conducted under operating conditions comprising:
      a temperature in the range of about 350° C. to about 450° C.; and
      a hydrogen gauge pressure in the range of about 6 MPa to about 18 MPa.

2. The process according to claim 1, wherein said lignin oligomers comprise about 5 wt % to about 40 wt % oxygen and wherein said lignin oligomers are produced by lignin depolymerization.

3. The process according to claim 1, wherein step (b) comprises one of:
dispersing said feedstock in at least one of: a recycled stream of said organic intermediate from said first continuous reactor or in a refinery stream; or
dissolving said feedstock in a solvent.

4. The process according to claim 3, wherein said refinery stream comprises at least one of: naphtha, kerosene, gas oil, vacuum distillate, fuel oil #2, light cycle oil (LCO), vacuum gas oil (VGO), middle distillates, or a blend thereof.

5. The process according to claim 3, wherein when said feedstock is dissolved in said solvent, said solvent comprises at least one of: 2-methoxyphenol, ethyl acetate, methanol, ethanol, propanol, butanol, or a blend thereof.

6. The process according to claim 1, wherein said first catalyst is a metal catalyst, said metal catalyst comprising at least one metal, said at least one metal being selected from at least one of Group VIB elements or Group VIIIB elements.

7. The process according to claim 6, wherein said Group VIB element is at least one of molybdenum or tungsten and wherein said Group VIIIB element is at least one of iron, cobalt, nickel, ruthenium, rhodium, palladium, or platinum.

8. The process according to claim 1, said first catalyst comprising at least one of metal sulphides, metal carbides, metal nitrides, or metal phosphides.

9. The process according to claim 1, wherein said first catalyst is supported on a catalyst support comprising at least one of: silicon dioxide, aluminum oxide, zirconium oxide, cerium oxide, titanium oxide, magnesium oxide, barium oxide, lanthanum oxide, activated carbon, magnesium aluminate spinel, or zeolites.

10. The process according to claim 1, wherein said second catalyst is a metal catalyst, said metal catalyst comprising at least one metal, said at least one metal being selected from at least one of Group VIB elements or Group VIIIB elements.

11. The process according to claim 10, wherein said Group VIB element is at least one of molybdenum or tungsten and wherein said Group VIIIB element is at least one of: iron, cobalt, nickel, ruthenium, rhodium, palladium, or platinum.

12. The process according to claim 1, said second catalyst comprising at least one of: metal sulphides, metal carbides, metal nitrides, or metal phosphides.

13. The process according to claim 1, wherein said second catalyst is supported on a catalyst support comprising at least one of: silicon dioxide, aluminum oxide, zirconium oxide, cerium oxide, titanium oxide, magnesium oxide, barium oxide, lanthanum oxide, activated carbon, magnesium aluminate spinel, or zeolites.

14. The process according to claim 1, wherein said first continuous reactor is one of: a fixed-bed reactor, a slurry reactor, or an ebullated-bed reactor.

15. The process according to claim 1, wherein said second continuous reactor is one of: a fixed-bed reactor, a slurry reactor, or an ebullated-bed reactor.

16. The process according to claim 1, wherein said first catalyst comprises one of:
at least one Group VIB metal, the at least one Group VIB metal having a metal loading range of about 4 wt % to about 40 wt %;
at least one non-noble Group VIIIB metal, the at least one non-noble Group VIIIB metal having a metal loading range of about 4 wt % to about 40 wt %;
at least one Group VIB metal and at least one non-noble Group VIIIB metal, wherein the total metal loading range is about 4 wt % to about 40 wt %;
at least one noble Group VIIIB metal, the at least one noble Group VIIIB metal having a metal loading range of about 0.1 wt % to about 6 wt %; or
at least one noble Group VIIIB metal and at least one non-noble Group VIIIB metal, wherein the metal loading range of the at least one noble Group VIIIB metal is about 0.1 wt % to about 6 wt % and wherein the metal loading range of the at least one non-noble Group VIIIB metal is about 4 wt % to about 40 wt %, and
wherein said first catalyst is suitable for hydrodeoxygenating said feedstock stream to thereby produce said partially hydrodeoxygenated intermediate.

17. The process according to claim 1, wherein said second catalyst comprises one of:
at least one Group VIB metal, the at least one Group VIB metal having a metal loading range of about 4 wt % to about 40 wt %;
at least one non-noble Group VIIIB metal, the at least one non-noble Group VIIIB metal having a metal loading range of about 4 wt % to about 40 wt %;
at least one Group VIB metal and at least one non-noble Group VIIIB metal, wherein the total metal loading range is about 4 wt % to about 40 wt %;
at least one noble Group VIIIB metal, the at least one noble Group VIIIB metal having a metal loading range of about 0.1 wt % to about 6 wt %; or
at least one noble Group VIIIB metal and at least one non-noble Group VIIIB metal, wherein the metal loading range of the at least one noble Group VIIIB metal is about 0.1 wt % to about 6 wt % and wherein the metal loading range of the at least one non-noble Group VIIIB metal is about 4 wt % to about 40 wt %, and
wherein said second catalyst is suitable for hydrodeoxygenating said organic intermediate to thereby produce said hydrodeoxygenated product.

18. The process according to claim 1, wherein said fractionating in said step (g) comprises fractionating by distillation of said hydrocarbon product to thereby produce at least one of jet fuel, diesel, or naphtha.

19. The process according to claim 18, wherein:
said aviation fuel meets or exceeds at least one of: ASTM™ D7566 specifications or CAN/CGSB™-3.323-2020 specifications; or
said diesel meets or exceeds at least one of: ASTM™ D975 specifications and CAN/CGSB™-3.517-2020 specifications.

* * * * *